Sept. 17, 1963 G. NEWBERG 3,104,071

TAPE REEL TORQUE CONTROL SYSTEM FOR TAPE HANDLERS

Filed May 27, 1960

INVENTOR.
GERALD NEWBERG
BY Alfred W. Barber
ATTORNEY

INVENTOR.
GERALD NEWBERG
BY Alfred W. Barber
ATTORNEY

United States Patent Office 3,104,071
Patented Sept. 17, 1963

3,104,071
TAPE REEL TORQUE CONTROL SYSTEM FOR TAPE HANDLERS

Gerald Newberg, Syosset, N.Y., assignor to Potter Instrument Co., Inc., Plainview, N.Y., a corporation of New York Filed May 27, 1960, Ser. No. 32,332
3 Claims. (Cl. 242—55.12)

The present invention concerns magnetic tape recorders and, in particular, methods of and means for improving the functioning of the take-up reels.

Basically a tape recorder and reproducer includes a recording/reproducing head, a pair of tape storage reels and means for driving the tape in either direction. The tape drive is usually a capstan drive in which an idler roller is pulled down to pinch the tape between it and a driven capstan. It is one common practice that the ends of the tape are carried on separate reels which are maintained in constant torque by separate, constant torque motors. It is desirable when moving tape, that the reel motors impart negligible retarding force to the tape. The problem encountered is that when the tape is driven in a given direction by a pinch roller-capstan drive, the take-up reel in one direction is receiving tape and the other reel is paying out tape so that the low tape force requirements are upset if both reels are driven equally. It would be preferable to increase the torque in the take-up reel motor and decrease the torque in the paying out reel motor thus always aiding tape motion. The object of the present invention is thus, to do just this.

Accordingly one object of the present invention is to provide a method of and means for adjusting the torque in take-up reels of a tape transport in accordance with requirements set-up by the direction of motion of the tape.

Another object is to increase torque automatically in a tape transport take-up reel in accordance with the direction of drive of the tape.

These and other objects will be apparent from the detailed description of the invention given in connection with the figures of the drawing.

Figure 1:
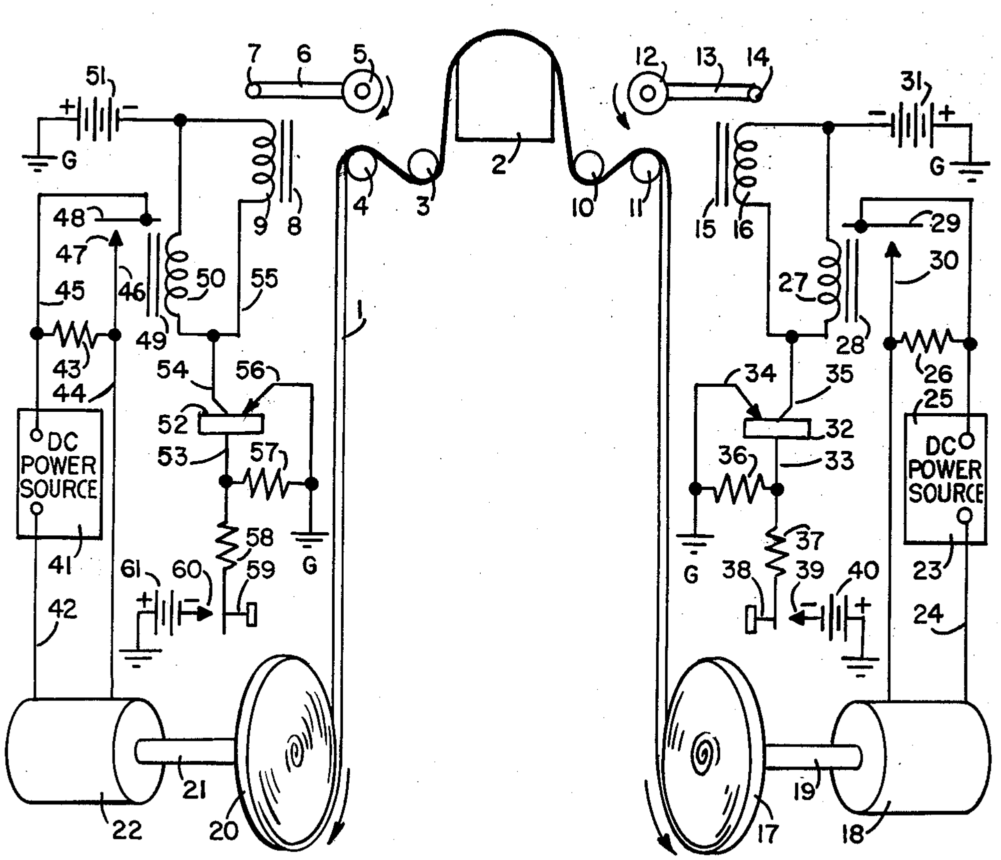
FIG. 1 is a schematic view showing a preferred form of the present invention.

In FIG. 1 is shown a magnetic tape 1 passing over a recording/reproducing head 2 and idler rollers 3 and 10. Pinch roller 5 is mounted on an arm 6 pivoted at 7 and controls one direction of drive in bringing tape 1 into driving contact with drive capstan 4 rotated by conventional means not shown. Rotation is in the direction of the arrow for driving tape 1 toward take-up reel 20. Similarly pinch roller 12 is mounted on arm 13 pivoted at 14 and drives tape 1 in the direction of take-up reel 17 when pulled down to bring tape 1 into driving contact with rotating capstan 11. Reel 20 is driven by constant torque motor 22 through shaft 21 and reel 17 is driven by constant torque motor 18 through shaft 19. Pinch roller 5 is pulled down by core 8 energized by coil 9 so that tape 1 is pinched between pinch roller 5 and driven capstan roller 4 and is thus moved in the direction of reel 20. Coil 9 receives energizing current from a suitable source such as transistor 52 having base 53, emitter 56 and collector 54, supplied by battery 51. Emitter 56 is returned to ground G and base 53 is connected to shunt resistor 57, series resistor 58 and to contact 59 of switch 59—60. The other contact 60 is connected to a suitable bias such as battery 61 so that when contacts 59—60 are closed transistor 52 passes current through coil 9 pulling down arm 6 to drive tape 1 and also through the parallel coil 50 energizing core 49 to pull down contact arm 48 and closing contacts 47—48. Contacts 47—48 are connected across resistor 43 by means of leads 45 and 46 so that resistor 43 is shorted when coil 50 is energized. Constant torque motor 22 is energized from a suitable source of current such as D.C. power source 41 over leads 42 and 44 and through resistor 43. This resistor 43 is placed in series between motor 22 and current source 41 to reduce the torque applied to reel 20 so that when it is shorted out of the circuit, the motor torque is increased. The switch 59—60 as well as other specific circuit elements are illustrative of one way in which the invention may be practiced and it will be understood that any equivalent circuits may be employed. It is anticipated that the present invention will be normally a part of a more or less complex system.

The sequence of operation of the automatic torque increasing system set forth above starts with closing of switch 59—60 which through transistor 52 energizes coils 9 and 50. These coils in turn energize cores 8 and 49 respectively the first pulling armature 6 so that capstan 4 drives tape 1 toward reel 20 and switch 47—48 shorts resistor 43 increasing torque in motor 22 and hence increasing the pull of reel 20 in the direction of motion of the tape.

On the other side of head 2 there is provided another torque increasing circuit for operation when the tape is moved in the reverse direction from that described above. Pinch roller 12 mounted on arm 13 pivoted at 14 is pulled down to pinch tape 1 against driven capstan 11 when core 15 is energized by coil 16. This coil 16 is energized in response to a suitable circuit closure such as switch 38—39 which applies an activating negative bias from battery 40 through series resistor 37 and across shunt resistor 36 to base 33 of transistor 32. To complete the circuit, emitter 34 is grounded at G, collector 35 is connected through coil 16 to battery 31 which in turn is returned to ground G. The take-up reel 17 is rotated by constant torque motor 18 through shaft 19. Motor 18 is energized from a suitable source of power 23 over leads 24 and 25 and through a torque reducing impedance consisting of resistor 26. In order to automatically increase the torque when the pinch roller is activated by closing switch 38—39, relay coil 27 is connected in shunt with coil 16. Thus when pinch roller 12 is activated to cause capstan 11 to pull tape, coil 27 is energized causing core 28 to draw armature 29 into contact with contact 30 and shorting resistor 26. Shorting resistor 26 causes additional current to flow to motor 18 thereby increasing its torque to pull tape in the direction of motion established by pinch roller 12.

As has now been described above, the torque to the take-up reels is automatically increased in the direction established by the pinch rollers whether that is in one direction or the other.

Figure 2:
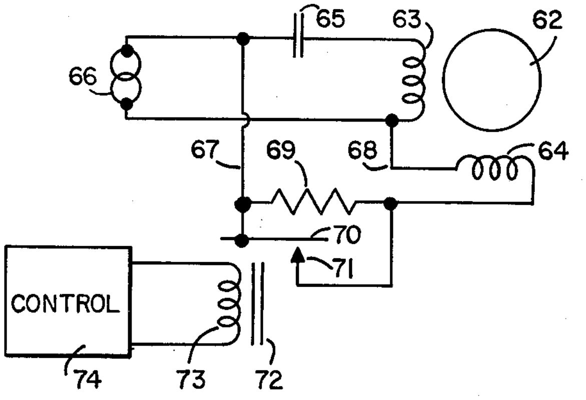
FIG. 2 is a schematic view showing a modification of a portion of the present invention.

FIG. 2 shows a modification in which a capacitor type A.C. motor is used to drive the reels. This figure shows only a portion of the entire circuit and only so much as is necessary to show how the present invention can be applied to this type of motor. The motor includes rotor 62 and split windings 63 and 64. Capacitor 65 is connected in series with winding 63 and a source of A.C. power 66 while winding 64 is connected across this source of power over leads 67 and 68 in series with torque reducing impedance 69. This torque reducing impedance may be shorted out by contacts 70 and 71 of relay 72, 73 under control of circuits as described above and represented by box 74.

Figure 3:
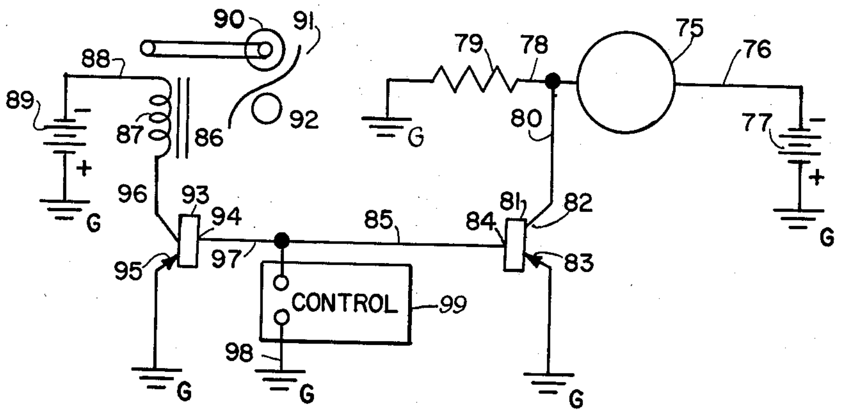
FIG. 3 is a schematic view showing a further modification of the present invention.

FIG. 3 shows a still further modification of the present invention in which constant torque D.C. motor 75 is connected in series with a source of power 77 and a torque reducing resistor 79 over leads 76 and 78. Only one pinch roller 90 is shown and other details such as the take-up reels are omitted since their utilization will be clear from the description of FIG. 1. Control 99 may be taken to represent a switch or any other simple or complex circuit used to initiate motion of tape 91. Control 99 is connected to ground G over lead 98 and to bases 94 and 84 of transistors 93 and 81 over leads 97 and 85 respectively. The circuit of transistor 93 is completed by connecting emitter 95 to ground G and collector 96 to coil 87 and over lead 88 to bias source 89. The circuit of transistor 81 is completed by connecting emitter 83 to ground G and collector 82 over lead 80 to the high end of resistor 79. It will now be seen that when the control circuit is closed, transistors 93 and 81 are activated energizing coil 87 which through core 86 pulls down pinch roller 90 gripping tape 91 against idler 92 driving it forward, and shunting resistor 79 so that the torque of reel motor 75 is increased.

Figure 4:
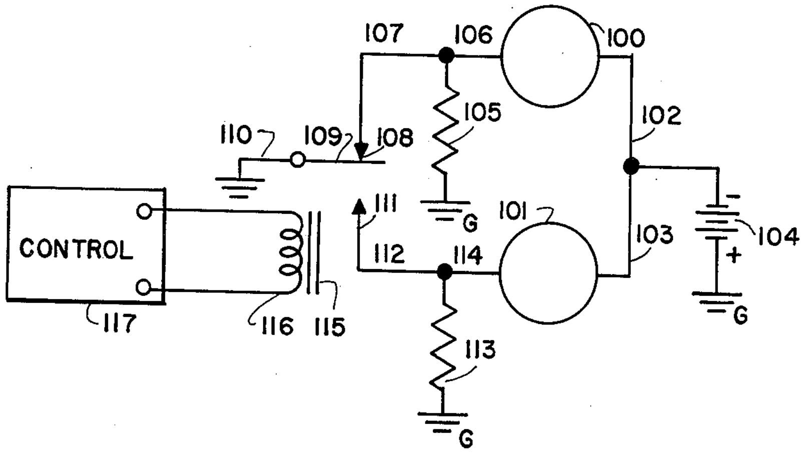
FIG. 4 is a schematic view showing a still further modification of the present invention.

FIG. 4 shows a still further modification in which only portions of the circuit are shown for purposes of illustration, the complete system being readily deduced from the description of FIG. 1 given above. Two reel drive motors 100 and 101 are shown, one for each direction of reel take-up. A suitable source of power 104 is connected with one end going to ground G and the other end over leads 102 and 103 to motors 100 and 101 respectively. Motor 100 is returned to ground G through torque reducing resistor 105 and motor 101 through torque reducing resistor 113. Control 117 may be taken to represent all control circuits up to relay coil 116 and operating at the same time a pinch roller drive not shown. Coil 116 energizing core 115 moves contact 109 from contact 108 to contact 111. Contact 109 is returned to ground G over lead 110 so that when at rest resistor 105 is shorted and when pulled down resistor 113 is shorted. Thus when the control operates to move the tape in a given direction, the short across resistor 105 is removed and a short is placed across resistor 113. This action then decreases the torque in motor 100 and increases it in motor 101. Motor 100 may be taken to be the motor connected to the pay-out reel and 101 to the take-up reel so that the two actions are coordinated with the motion of the tape.

While a few forms of the present invention have been shown and described, many modifications will be apparent to those skilled in the art and within the spirit and scope of the invention as set forth in particular in the appended claims.

What is claimed is:

1. In a tape handler, the combination of, a pinch roller for moving tape in a given direction, a take-up reel, a direct current motor for winding-up said tape in said given direction, a resistor in series with said motor and its source of direct current power, an electromagnet including a coil and an armature for pulling said pinch roller into driving position contact with said tape, a source of control signal, a transistor connected to said source and to said coil for energizing said electro-magnet, and a second transistor connected to said source and to said resistor for increasing the torque of said motor.

2. In a tape handler apparatus, the combination comprising, means for guiding a tape across a recording/reproducing head, a pinch roller-drive capstan mechanism for moving said tape in a predetermined direction, a tape storage reel from which tape may be pulled against a drag of a predetermined magnitude, means connected with the storage reel to develop said drag of predetermined magnitude, first circuit means including means to connect with a source of electrical energy to operate the pinch roller for pinching said tape against the drive capstan to move said tape in said predetermined direction, a take-up reel, a substantially constant torque motor drive connected to turn the take-up reel to wind tape thereon, and second circuit means connected to be responsive to the first circuit means for increasing the torque developed by the motor drive to a magnitude greater than said drag.

3. In a tape handler apparatus, the combination comprising, means for guiding a tape across a recording/reproducing head, a pinch roller-drive capstan mechanism for moving said tape in a predetermined direction, first circuit means including means to connect with a source of electrical energy for energizing the pinch roller-drive capstan mechanism to move said tape in a predetermined direction, a take-up reel, a substantially constant torque motor drive connected to turn the take-up reel to wind tape thereon, means to develop a predetermined drag on the tape, second circuit means for increasing the torque developed by the motor drive to a magnitude greater than said drag, and a switch means common to both the first and second circuit means for modifying the torque developed by the motor drive when the pinch roller-drive capstan mechanism is energized.

References Cited in the file of this patent

UNITED STATES PATENTS

| | | |
|---|---|---|
| 2,726,048 | Crain | Dec. 6, 1955 |
| 2,732,144 | Jones | Jan. 24, 1956 |